(12) United States Patent
Pandya

(10) Patent No.: US 9,056,784 B2
(45) Date of Patent: *Jun. 16, 2015

(54) HIGH EFFICIENCY WATER-SOFTENING PROCESS

(76) Inventor: Ken V. Pandya, Plano, TX (US)

( * ) Notice: Subject to any disclaimer, the term of this patent is extended or adjusted under 35 U.S.C. 154(b) by 513 days.

This patent is subject to a terminal disclaimer.

(21) Appl. No.: 13/398,648

(22) Filed: Feb. 16, 2012

(65) Prior Publication Data

US 2012/0145643 A1 Jun. 14, 2012

Related U.S. Application Data

(63) Continuation-in-part of application No. 11/523,679, filed on Sep. 19, 2006, now Pat. No. 8,147,696.

(51) Int. Cl.
| | |
|---|---|
| *B01D 61/14* | (2006.01) |
| *B01D 61/58* | (2006.01) |
| *C02F 1/52* | (2006.01) |
| *C02F 1/56* | (2006.01) |

(Continued)

(52) U.S. Cl.
CPC . *C02F 1/56* (2013.01); *B01D 61/58* (2013.01);
*B01D 21/01* (2013.01); *C02F 1/001* (2013.01);
*C02F 1/5236* (2013.01); *C02F 1/66* (2013.01);
*C02F 2001/007* (2013.01); *C02F 2101/203*
(2013.01); *C02F 2101/206* (2013.01); *C02F
2101/32* (2013.01); *C02F 2209/001* (2013.01);
*C02F 2209/10* (2013.01); *C02F 2209/20*
(2013.01); *C02F 1/04* (2013.01); *C02F 5/00*
(2013.01); *C02F 11/122* (2013.01); *C02F
2101/10* (2013.01)

(58) Field of Classification Search
CPC ........ B01D 21/01; B01D 61/58; B01D 61/14;
C02F 1/52; C02F 1/6209; C02F 1/56; C02F
1/58; C02F 5/00; C02F 9/00; C02F 1/5236;
C02F 2101/10; C02F 2101/101; C02F
2101/206; C02F 2101/32; C02F 2209/001;
C02F 2209/06; C02F 2209/07; C02F 2209/20;
C02F 1/001; C02F 1/04; C02F 1/66; C02F
5/02; C02F 9/04; C02F 2209/10; C02F
2001/007
USPC ......... 210/638, 639, 650, 651, 709, 717, 719,
210/724–727, 739, 804, 806, 908, 911, 912
See application file for complete search history.

(56) References Cited

U.S. PATENT DOCUMENTS 3,097,163 A * 7/1963 Riddick ........................ 210/714
3,171,804 A 3/1965 Rice
(Continued)

*Primary Examiner* — Joseph Drodge
(74) *Attorney, Agent, or Firm* — Jack D. Stone, Jr.; Scheef & Stone, L.L.P.

(57) ABSTRACT

A high-efficiency water softening process is disclosed. The softening-process is particularly effective for the treatment of water process streams containing a broad array of contaminants, such as Ca, Mg, Ba, Sr, iron, aluminum, manganese, copper, zinc, silica, TOC, oil, and grease. The softening-process includes steps of: (a) adding carbonate ions and hydroxide ions to said water process stream until the process stream pH is raised to between at or about 10.5 and at or about 14.0; (b) optionally adding a coagulation aid so as to facilitate the creation of separated solids comprising a substantial portion of the contaminants; (c) optionally adding a polyelectrolyte so as to facilitate the creation of separated solids comprising a substantial portion of the contaminants; and (d) phase-separating the separated solids so as to remove the contaminants and produce a highly purified water process stream.

30 Claims, 8 Drawing Sheets

(51) Int. Cl.
  *C02F 1/04* (2006.01)
  *C02F 5/02* (2006.01)
  *C02F 9/04* (2006.01)
  *B01D 21/01* (2006.01)
  *C02F 1/66* (2006.01)
  *C02F 1/00* (2006.01)
  *C02F 101/20* (2006.01)
  *C02F 101/32* (2006.01)
  *C02F 5/00* (2006.01)
  *C02F 11/12* (2006.01)
  *C02F 101/10* (2006.01)

(56) References Cited

U.S. PATENT DOCUMENTS

| | | | |
|---|---|---|---|
| 3,262,877 A | 7/1966 | Compte, Jr. | |
| 3,393,149 A * | 7/1968 | Conley et al. | 210/709 |
| 3,976,569 A | 8/1976 | Sheppard et al. | |
| 4,036,749 A | 7/1977 | Anderson | |
| 4,108,768 A | 8/1978 | Sebelik et al. | |
| 4,312,758 A * | 1/1982 | Berton et al. | 210/709 |
| 4,392,944 A | 7/1983 | Kessick | |
| 4,981,599 A | 1/1991 | Stewart, Jr. | |
| 5,059,317 A | 10/1991 | Marius et al. | |
| 5,266,210 A | 11/1993 | McLaughlin | |
| 5,411,889 A * | 5/1995 | Hoots et al. | 436/6 |
| 5,879,563 A | 3/1999 | Garbutt | |
| 5,925,255 A | 7/1999 | Mukhopadhyay | |
| 6,296,773 B1 | 10/2001 | McMullen et al. | |
| 6,416,668 B1 * | 7/2002 | Al-Samadi | 210/636 |
| 6,440,310 B1 * | 8/2002 | Shorr et al. | 210/651 |
| 6,537,456 B2 | 3/2003 | Mukhopadhyay | |
| 6,582,605 B2 | 6/2003 | Krulik et al. | |
| 7,022,240 B2 | 4/2006 | Hart et al. | |
| 7,048,852 B2 | 5/2006 | Ballard | |
| 7,520,993 B1 | 4/2009 | Laraway et al. | |
| 7,815,804 B2 | 10/2010 | Nagghappan | |
| 7,824,552 B2 | 11/2010 | Slabaugh et al. | |
| 8,147,696 B1 * | 4/2012 | Pandya | 210/638 |
| 2002/0046974 A1 * | 4/2002 | Shorr et al. | 210/637 |
| 2007/0221552 A1 * | 9/2007 | Denney | 210/85 |
| 2008/0135478 A1 | 6/2008 | Zuback et al. | |
| 2010/0320155 A1 | 12/2010 | Enos et al. | |

* cited by examiner

HIGH EFFICIENCY WATER-SOFTENING PROCESS

CROSS-REFERENCE TO RELATED APPLICATIONS

This application is a continuation-in-part application of prior application Ser. No. 11/523,679, filed Sep. 19, 2006, now U.S. Pat. No. 8,147,696.

FIELD OF THE INVENTION

This invention relates generally to water treatment/purification processes and, specifically, to water-softening processes which are effective in treating highly contaminated surface waters, well waters, waste waters, produced waters, and process effluent waste streams.

BACKGROUND OF THE INVENTION

To understand what is commonly referred to as a "water-softening" process, one need only understand the etymology of the classic definition of water "hardness." Traditionally, "hard" water was water that featured high levels of certain common impurities such as calcium (Ca) and magnesium (Mg). Water purification processes which facilitated the removal of these offensive "hard" cations were therefore quickly referred to as "water-softening" processes, a term that has prevailed even as purification processes have advanced and expanded in scope.

Various approaches have been adopted in the search for an industrially robust, high-efficiency water-softening process that could address a broad range of impure waters. Many of these approaches feature important shortcomings.

For example, most of the conventional water-softening processes are designed for relatively low levels of hardness (and, specifically, hardness of a sort consisting mostly of Ca and Mg). The novel water-softening process disclosed herein is effective for a broad range and level of contaminants. Specifically, it is particularly well-suited for removing a broad (but, unfortunately, common) array of contaminates (namely calcium, magnesium, barium, strontium, copper, zinc, iron, manganese, aluminum, silica, TOC [total organic carbon], oil, grease, TDS [total dissolved solids] and TSS [total suspended solids]).

Unlike many conventional water-softening processes that use lime (CaO) and soda ash ($Na_2Co_3$) as the primary chemical agents to deliver bicarbonate and carbonate alkalinities, the novel softening process can utilize carbon dioxide and/or carbon monoxide in alkaline solution, thus creating bicarbonate or carbonate ions by chemical reaction.

Unlike conventional cold lime softening, hot lime softening or lime-soda ash softening, reverse osmosis membrane, or electro-dialysis reversal processes, all of which are typically conducted at a pH level below 10.5, the novel water-softening process disclosed herein works at elevated pH levels, and not uncommonly at pH levels from 10.5 to 14.0.

Unlike conventional cold lime softening, hot lime softening, or lime-soda ash softening processes that rely on the use of lime and soda ash as the primary softening agents, the novel water-softening process disclosed herein can work with soda-ash, potassium hydroxide, or sodium hydroxide as the chemical agents.

Unlike hot-lime softening processes, which must be conducted at elevated temperatures in order to be effective, the novel water-softening process disclosed herein can be carried out at ambient temperatures, although the rate of reaction will be faster at elevated temperatures.

In the conventional lime softening process, hot lime softening process, or lime-soda ash process, it is sometimes difficult to ensure that the lime (CaO) or hydrated lime (Ca$(OH)_2$) goes effectively into solution. The novel water-softening process disclosed herein does not feature this particular problem, as soda ash can readily go into solution and sodium hydroxide is soluble in all concentrations.

In conventional lime softening processes, hot lime softening processes, lime-soda ash processes, processes that use softening membranes, and/or processes that use electro-dialysis membranes, the treated water will nearly always contain some levels of calcium impurities, as well as magnesium, Ba, Sr, and other metals. The novel water-softening process disclosed herein works extremely efficiently in terms of removing these impurities to negligible levels.

Some prior art approaches, such as the approach described in U.S. Pat. No. 5,152,904, utilize a process frequently referred to as a seeded slurry process; however, the novel water-softening process disclosed herein does not feature or require such an approach. Similarly, some seeded slurry processes are critically dependent upon the size of the crystal; once again, the novel water-softening process disclosed herein has no such crystal size dependency.

Unlike energy-driven processes such as reverse osmosis, electro-dialysis, or electro-deionization, the novel water-softening process disclosed herein utilizes very little energy; in fact, in most cases, the energy consumption comes from mixing devices and transfer pumps. Furthermore, the water-novel softening process can be carried out under atmospheric pressure or at elevated pressures.

Unlike most competitive processes, such as reverse osmosis, the novel water-softening process disclosed herein does not require expensive materials of construction such as high-quality alloys. In most cases, inexpensive materials, such as polyvinyl chloride (hereinafter "PVC"), fiberglass, carbon steel, or stainless steel, can be used. In some applications that contain extremely high levels of chlorides, it may be advantageous to use super-stainless steel or duplex stainless steel materials.

In the conventional processes that utilize reverse osmosis membrane technologies, electro-dialysis membrane technologies, or electro-deionization membranes, it is extremely critical to remove sparingly soluble species (such as calcium, magnesium, silica, barium and strontium) in the pretreatment process; otherwise, the calcium, magnesium, silica, barium or strontium deposits could form a devastating scale on the process components. The novel water-softening process disclosed herein has no limits with respect to the levels of these scaling agents and can be effective as a pretreatment process.

Unlike the membrane based softening processes that generally get fouled in the presence of excess amounts of certain coagulation aid chemicals (such as alum or ferric salts or polymers), the novel water-softening process disclosed herein can be carried out in presence of excess amounts of coagulation aid chemicals.

Some prior art efforts in this area, such as, for example, U.S. Pat. No. 3,976,569, utilize cross flow filtration membranes; however, the instant novel water-softening process does not require the use of such membranes.

In addition, unlike the Green and Behrman process disclosed in U.S. Pat. No. 1,653,272, which is mostly intended for hardness based upon Ca and Mg impurities, and which mostly uses a lime and soda-type process (again, used for mostly low-hardness surface waters), the novel water-softening process is intended for a broad range of contaminations. It uses a high-pH mode of operation by using chemicals such as soda ash and/or sodium hydroxide, potassium carbonate, or potassium hydroxide and is intended to treat surface waters, seawater, produced waters from oil and gas drilling operations and wastewaters from municipal as well as industrial applications.

The novel water-softening process disclosed herein is not an ion exchange process.

Ion exchange processes are mostly batch processes; they generally achieve water softening by exchanging ions on an ion exchange resin. Once the ion exchange resin is fully exhausted (i.e., it has no further capability for exchanging hardness for, e.g., the sodium ion or the hydrogen ion), it has to be regenerated, typically, by either a sodium chloride solution (NaCl), a hydrochloric acid solution (HCl), or a sulfuric acid solution ($H_2SO_4$).

Conventional ion exchange processes are very inefficient in terms of chemicals usage for the removal of specific impurities. Also, note that ion exchange systems simply do not work for highly contaminated streams, because the throughput capacities become very small (i.e., the ion exchange systems in such applications tend to require almost constant regeneration). Furthermore, spent regeneration chemicals have to be disposed of which presents a further managerial/technical problem.

The novel water-softening process disclosed herein is extremely efficient in terms of producing high-quality effluent while simultaneously generating a minimum volume disposal stream. In fact, a typical sludge/waste stream from the novel softening process can be reprocessed to recover the water stream, thus making the novel softening process an important part of any zero liquid discharge (hereinafter "ZLD") process.

Conventional ion exchange water softeners require use of a sodium chloride (NaCl) solution for regeneration. These processes are mostly effective in exchanging Ca and Mg species, and low levels of to Ba and Sr. Furthermore, any presence of iron, manganese, oil, grease, and/or organic matter tends to create serious fouling of the ion exchange resin. The novel water-softening process disclosed herein does not have such process limitations.

Finally, the conventional ion exchange water softeners of the prior art commonly require removal of suspended solids; from the treated stream otherwise, once again, the ion exchange resin can get plugged up and/or foul. The novel water-softening process disclosed herein does not have such limitations.

Zero liquid discharge (hereinafter "ZLD") technologies utilize a combination of pretreatment processes such as those described in the sections hereinabove.

In the conventional ZLD systems that utilize either lime, lime/soda ash, or hot lime, the resultant process stream is typically further treated with acid or scale inhibitors to lower scale-forming tendencies and/or to prevent further precipitation or scaling due to silica, calcium, magnesium, barium and/or strontium salts. The novel water-softening process disclosed herein does not have such requirements.

In some ZLD systems, the effluent pH from the pretreatment is lowered (to less than about 5) to reduce the scaling potential due to the presence of calcium, magnesium, strontium and/or barium. The lower pH effluent is typically highly aggressive on conventional metals such as carbon steel or lower grades of stainless steel, and requires the use of exotic (and expensive) metallurgy such as titanium alloys, Hastalloy C, and/or Alloy 20.

The novel water-softening process effluent, with pH values typically exceeding 10.5, do not require lowering of pH; thus, the metallurgy of the equipment downstream of the novel water-softening process can be fabricated from lower-cost alloys such as carbon steel, grade three zero four stainless steel (hereinafter "304 SS"), three hundred sixteen stainless steel (hereinafter "316 SS"), or Duplex stainless steel or Super duplex stainless steel or SMO 254. In certain situations, it is possible to fabricate the equipment downstream of the novel softening process from non-metallic materials such as polyvinyl chloride (hereinafter "PVC"), chlorinated PVC (hereinafter "CPVC"), polypropylene (hereinafter "PPL"), Teflon (hereinafter "PTFE"), or fiberglass reinforced plastic (hereinafter "FRP").

If the process stream is known to contain high levels of sodium, chlorides, sulfates, or carbonates and bicarbonates, the treated effluent from the novel water-softening process can be further treated by concentration processes or ZLD processes such as reverse osmosis, electro-dialysis, evaporators, or crystallizers. Concentrated streams from these processes can be highly pure, sterile, and could be recycled or reused for further industrial or non-industrial uses (such as, for example, dry salt or chemicals manufacturing processes). Concentrated streams from these processes can also be recycled or reused to "kill" gas wells after completion of gas extraction process.

In view of the continuing need for an improved process to efficiently and effectively remove contaminates from water streams, an improved high-efficiency water-process for removing contaminates has been developed.

BRIEF SUMMARY OF THE INVENTION

Accordingly, one embodiment of the invention is a process for removing at least some contaminants selected from the group consisting of Ca, Mg, Ba, Sr, Cu, Zn, iron, Mn, Al, $SiO_2$, TOC, oil, grease and TDS and TSS from a contaminated water stream, the process including steps of: (a) collecting a quantity of the water stream containing the contaminants for treatment; (b) analyzing the quantity of the water stream containing the contaminants for a composition and an amount of the contaminants in the quantity of the water stream; (c) adding at least one of carbonate or bicarbonate to the quantity of the water stream in an amount at least equivalent to the contaminants in the quantity of the water stream; (d) adjusting the pH of the quantity of the water stream to a value from about 10.5 to 14; (e) separating the solids from the quantity of the water stream; and (f) recovering water containing a reduced contaminant content.

In an alternate embodiment of the invention, a process for removing at least some contaminants selected from the group consisting of Ca, Mg, Ba, Sr, Cu, Zn, iron, Mn, Al, $SiO_2$, TOC, oil, grease and TDS and TSS from a contaminated water stream, includes steps of: (a) analyzing the water stream containing the contaminants for a composition and an amount of the contaminants in the water stream; (b) adding at least one of carbonate or bicarbonate to the water stream in an amount at least equivalent to the contaminants in the water stream; (c) adjusting the pH of the water stream to a value from about 10.5 to 14; (d) separating the solids from the water stream; and (e) recovering the water stream containing a reduced contaminant content.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF PREFERRED EMBODIMENTS

Figure 1A:
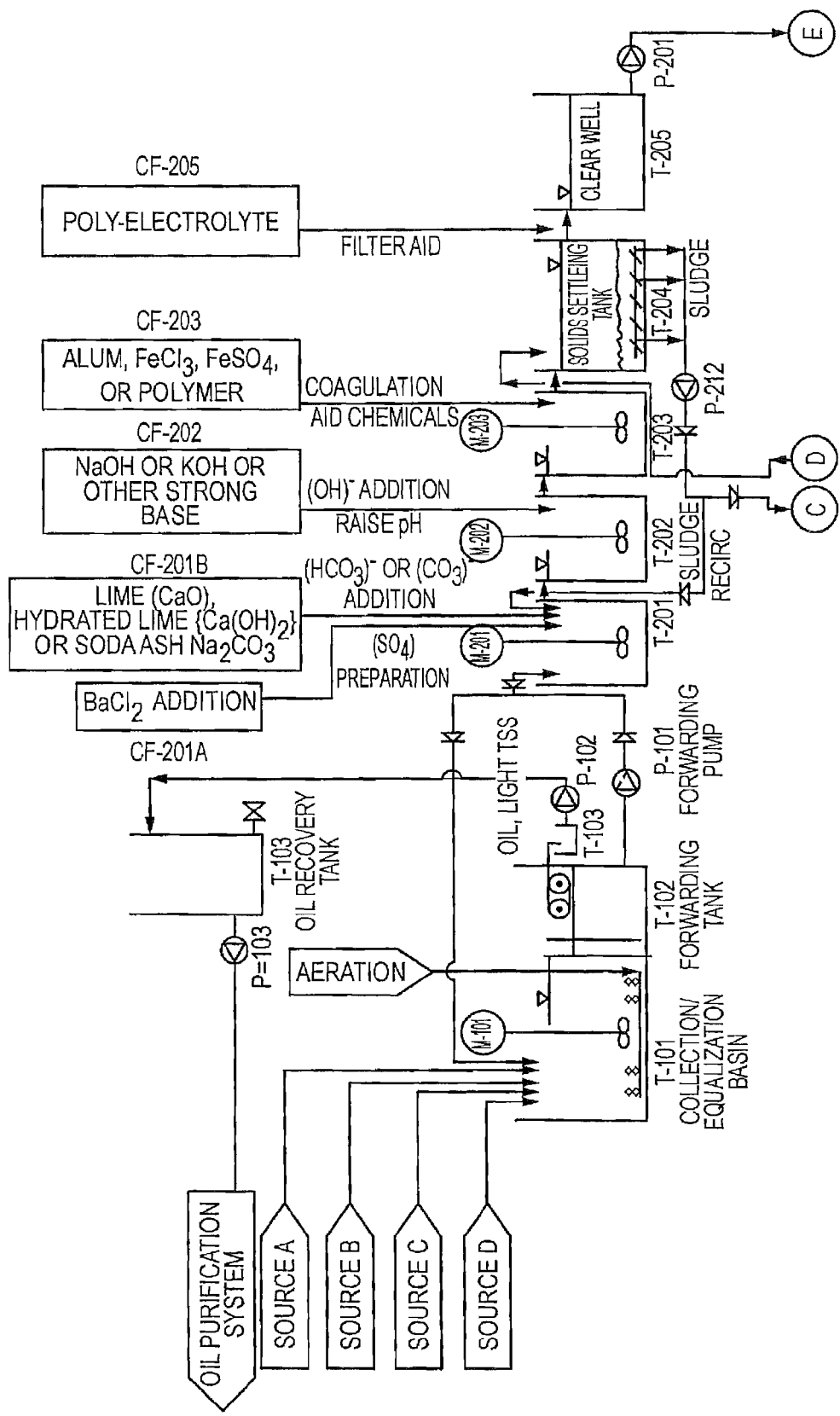
FIGS. 1A and 1B exemplify a piping/instrumentation drawing showing several aspects of one embodiment of the novel water-softening process disclosed herein.

The novel, high-efficiency softening process disclosed herein is a process that is extremely effective in treating highly contaminated surface waters such as well waters, waste water and process effluent streams. Specifically, the process disclosed facilitates the effective removal and/or reduction of certain inorganic contaminants such as calcium (Ca), magnesium (Mg), barium (Ba), strontium (Sr), iron (Ferrous Fe++ or Ferric Fe+++), manganese (Mn), zinc (Zn), and silica ($SiO_2$), as well as certain species such as oil, grease, total organic carbon (hereinafter "TOC"), biochemical oxygen demand (hereinafter "BOD"), total suspended solids (hereinafter "TSS"), and colloidal material.

These contaminants can be found in naturally occurring waters from almost all sources, including rivers, lakes, and the ocean. They can also be found in industrial, as well as municipal, wastewater streams, such as those waters produced from oil and gas drilling operations. These contaminants can be found in very low levels (e.g., less than 100 ppm measured as $CaCO_3$) to very high levels (e.g., as high as 15,000 ppm measured as $CaCO_3$).

The presence of cations such as Ca, Mg, Sr and Ba, when combined with anions such as $CO_3$, $HCO_3$ and $SO_4$, can cause scaling and fouling to equipment such as cooling towers, boilers, hot water heaters and heat exchange equipment. In advanced water treatment processes, such as reverse osmosis, electro-deionization, or electro dialysis, the presence of these materials can cause fouling or scaling, thus increasing the cost of maintenance and/or operation. The presence of these contaminants in certain process streams, such as, for example, sodium chloride (brine), can cause interference with the production of select chemicals such as caustic.

Disposal of waste streams that contain moderate to high levels of these species can also be a problem. In many parts of the world, industries and municipal agencies are required to eliminate the disposal of such streams. In certain parts of the world, the waste streams can be disposed of by means of deep-well injection; however, those streams must be pretreated in order to remove certain objectionable species such as iron, manganese, suspended solids, and TOC.

For advanced water softening processes, such as evaporators and crystallizers, the presence of high levels of species such as Ca, Ba, Sr, iron, manganese, aluminum and silica can be a real problem. The scaling or fouling of these materials on heating surfaces can cause a substantial loss of heat transfer and even accelerate the rate of corrosion.

The novel softening process disclosed herein works extraordinarily well under extremely difficult process conditions, including, for example, with aqueous solutions that contain very high levels of one or more of Ca, Mg, Sr, Ba, TOC, Fe, Mn, Al, $SiO_2$, oil, grease, TDS and TSS. In a recent study, the initial calcium and magnesium hardness level exceeded 10,500 mg/l, expressed as $CaCO_3$. Presence of such high levels of impurities can be found in highly concentrated waste streams, such as produced waters from oil and gas drilling operations, concentrated cooling tower blow-downs, reject streams from waste water recovered oil applications, landfill leacheate, and superfund sites.

It is believed that the novel water-softening process is effective, in part, because it introduces carbonate ($CO_3$) and hydroxyl (OH) species to form precipitates under high-pH conditions, typically in a pH range of 10.5-14.0.

Certain species such as silica, oil and grease can be co-precipitated or adsorbed on the carbonate, bicarbonate, hydroxyl or sulfate precipitates.

In most cases, the presence of coagulating aid chemicals (such as alum, ferric chloride, ferric sulfate, cationic or anion polymers, and polyelectrolyte chemicals) will enhance the coagulation process, making particles heavier, so as to facilitate quicker settling and enhance the speed of the reaction. Alternatively, the precipitated material could remain in solution which could be filtered out by cross-flow membrane processes such as, Microfiltration or Ultrafiltration.

Carbonate and bicarbonate species can be derived from naturally occurring chemical compounds such as quick lime (CaO), hydrated lime ($Ca(OH)_2$), or soda ash ($Na_2CO_3$).

In some cases, it may be more advantageous to consider reaction of carbon dioxide and/or carbon monoxide with alkali solution to create carbonate ions.

The novel water-softening process also allows for the addition of selected cations, such as Ca or Ba, to precipitate excess amounts of anions such as $SO_4$ and $CO_3$ at pH levels of 10.5-14.0.

In most cases, intimate mixing, contact time, and temperature of the process streams will play a critical role in enhancing the efficiency of the novel water-softening process.

Once the reaction is completed, the precipitated materials may be removed from the treated water stream by utilizing treatment processes such as settling, clarification, filtration, and/or advanced membrane separation.

Some of the chemical reactions which are believed to be important contributors to the overall mechanism of the novel softening process disclosed herein are:

(1) $CaCl_2 + Na_2CO_3 = CaCO_3 + 2\,NaCl$
(2) $CaCl_2 + K_2CO_3 = CaCO_3 + 2\,KCl$
(3) $BaCl_2 + Na_2SO_4 = BaSO_4 + 2\,NaCl$
(4) $SrCl_2 + Na_2SO_4 = SrSO_4 + 2\,NaCl$
(5) $CO_2 + 2NaOH = Na_2CO_3 + H_2O$
(6) $2CO + O_2 = 2CO_2$
(7) $Fe^{(+3)} + (OH) = Fe(OH)_3$
(8) $Al^{(+3)} + (OH) = Al(OH)_3$

Figure 2:
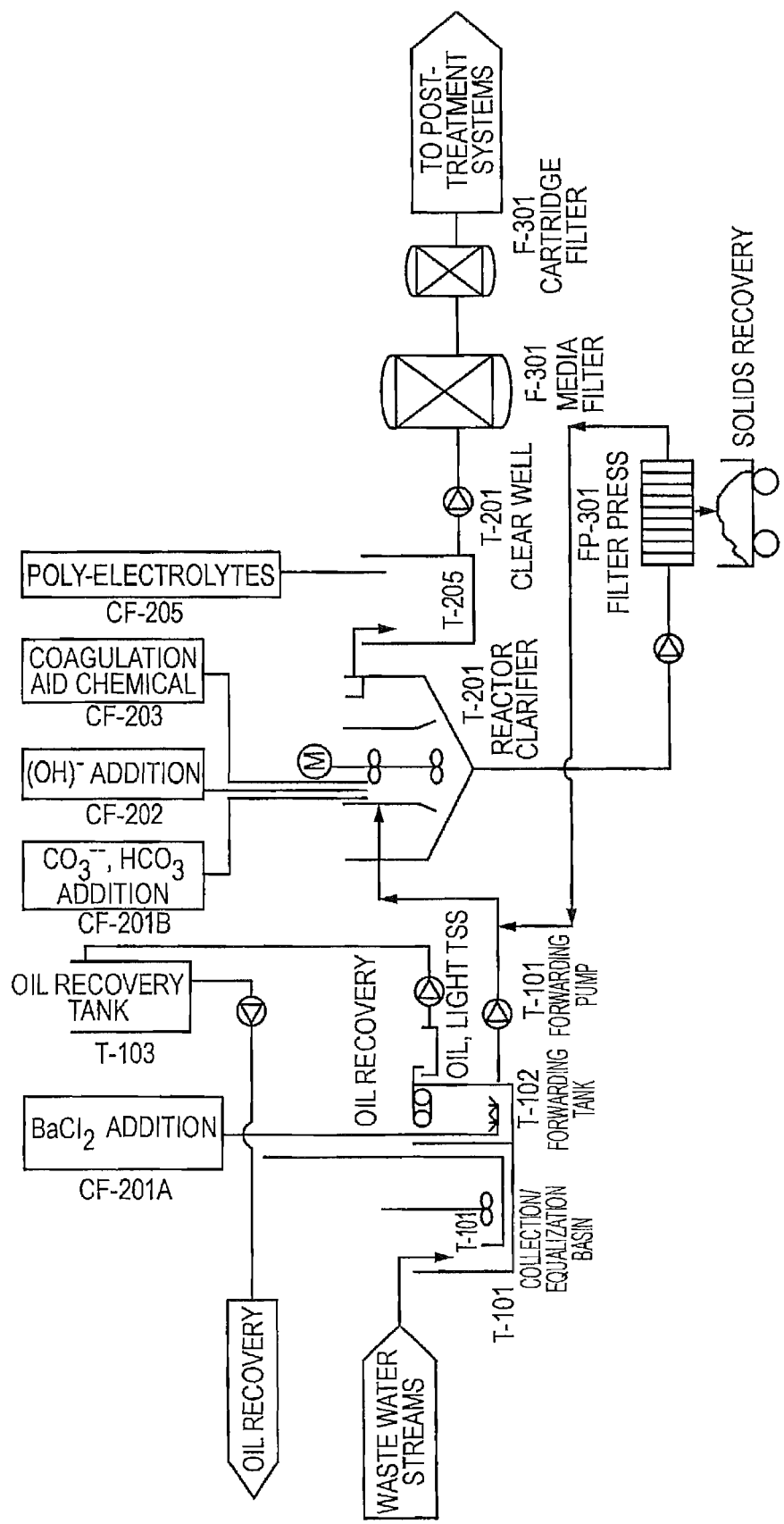
FIG. 2 exemplifies a piping/instrumentation drawing showing several aspects of an alternate embodiment of the novel water-softening process disclosed herein, the alternate embodiment comprising a reactor clarifier for performing the processes T-201, T-202, T-203, T-204 of the embodiment of FIGS. 1A and 1B.
Figure 5:
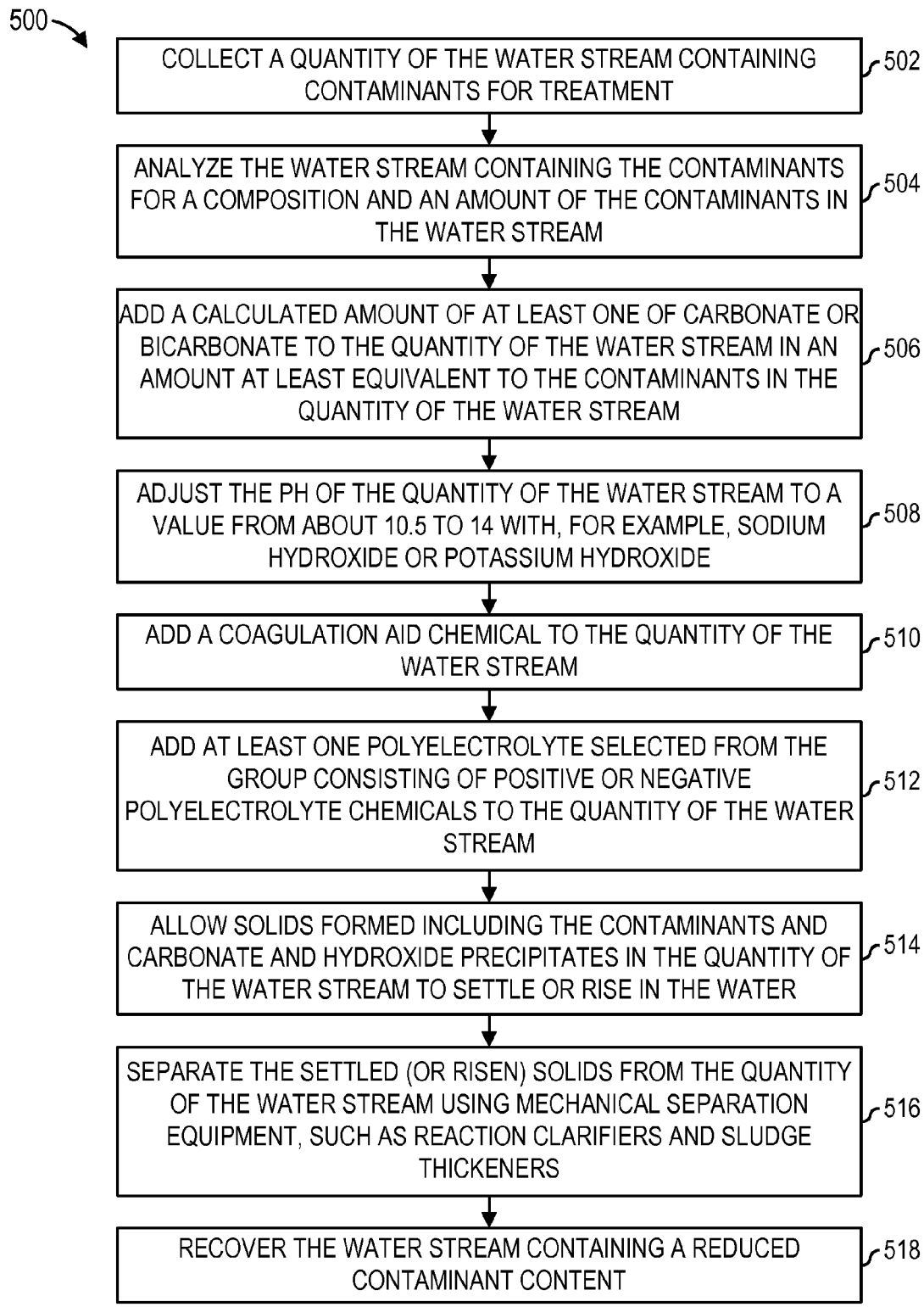
FIG. 5 exemplifies steps in a process utilizing coagulation aid chemicals in accordance with one preferred embodiment of the present invention.

With reference to FIG. 1A, water process stream sources A, B, C, and D, a collection equalization basin tank T-101, an oil skimmer and collection tank T-103, and an oil recovery tank T-103, and with reference to the alternative embodiment of FIG. 2, Tank T-101, and with reference to FIG. 5, step 502, in this first step a quantity of same or all of the contaminated process streams may be collected in a storage tank, pond or other vessel. If the feed water composition is known to vary, better results are obtained if mixing, either via mechanical mixers, aeration blowers, or close recirculation of the liquid waste streams, is effected so as to create as homogeneous a solution as possible.

With reference to FIG. 5, step 504, it is helpful to analyze the composition of the quantity of the process stream, including Ca, Mg, Na, Ba, Sr, K, $HCO_3$, $SO_4$, Cl, $SiO_2$, $NO_3$, Fe, Mn, oil and grease, TOC, pH, total dissolved solids (hereinafter "TDS"), conductivity, and TSS.

With reference to FIG. 1A, tank T-201, mixer M-201, chemical feed systems CF-201A and CF-201B for adding barium chloride, lime, hydrated lime, and/or soda ash, and with reference to the alternative embodiment of FIG. 2, $CO_3$ addition tank T-201 at reactor clarifier T-201, and with reference to FIG. 5, step 506, a calculated amount of carbonate or bicarbonate alkalinity is added in an amount at least stoichiometrically equivalent to the incoming amount of Ca, Mg, Sr, Ba and other impurities.

In most cases, up to twenty percent (20%) excess carbonate or bicarbonate alkalinity is added, so as to provide complete reaction and to speed the reaction process.

Calcium hydroxide slurries can be employed at this stage with the caveat that they do not always completely dissolve at lower pH levels; thus, while they can be used to effectuate an elevation of pH, they are more effective as the pH increases.

Carbonate ions may also be created by reaction of pure carbon dioxide or waste carbon dioxide or waste carbon monoxide. For example, exhaust from a diesel generator or a natural gas burning machine may be combined with a strongly basic solution such as sodium hydroxide or potassium hydroxide. In most such cases, carbonate ions are then formed at a pH higher than 8.2.

The use of waste carbon dioxide or waste carbon monoxide is advantageous for several reasons. Putting any waste component to work is environmentally friendly and prudent; however, in light of recent concerns raised by some scientists that excess waste carbon dioxide and waste carbon monoxide potentially contributes to the greenhouse effect and/or global warming, the additional benefits of this approach towards implementation/execution of the invention become obvious.

With reference to FIG. 1A, tank T-202, mixer M-202, chemical feed system CF-202 for adding NaOH, or KOH or other strong base, and with reference to the alternative embodiment of FIG. 2, chemical feed system CF-202 for adding OH at reactor clarifier T-201, and with reference to FIG. 5, step 508, a basic solution, such as sodium hydroxide or potassium hydroxide, is added to raise the operating pH to between about 10.5 and about 14.0. Homogeneous solutions are preferably created by mixing.

It is noteworthy that, frequently, addition of the alkalinity and adjustment of the pH may be combined, because, if, for example, only soda ash is added, the pH is rarely expected to go much higher than about 10.5, because of the nature of the chemical itself. To super-elevate the pH (i.e., to raise it higher than 10.5), the addition of an agent such as sodium hydroxide or potassium hydroxide is required.

This is a key reason why other processes feature an elevation of pH to at or about only 10.5. Partial contaminant reduction occurs at a pH below 10.5, but complete reduction of the type desired here generally occurs only at higher pH levels.

The desired pH range is preferably 12-14 and it is in this range that complete contaminant removal of the type desired occurs; however, it has also been observed that suboptimal, but nonetheless very good, results are observed in the pH range of 10.5-12.0.

With reference to FIG. 1A, tank T-203, mixer M-203, chemical feed system CF-203 for adding alum, ferric chloride, ferric sulfate, and/or polymer, and with reference to the alternative embodiment of FIG. 2, chemical feed system CF-203 for adding a coagulation aid chemical at reactor clarifier T-201, and with reference to FIG. 5, step 510, the required amount of coagulation aid chemical (such as ferric chloride, alum, polymer, or the like) is added to create a floc. A homogeneous solution is preferably created by mixing.

Note: alum (aluminum ammonium sulfate, aluminum potassium sulfate, aluminum sodium sulfate, aluminum sulfate), ferric chloride, ferric sulfate, polymers, and polyelectrolyte chemicals represent, as a class, the most commercially important coagulation aid chemicals in use today. In some commercial trials, even a low-cost waste stream comprising spent caustic soda solution (25% NaOH) and aluminum, which was used in an aluminum extrusion process to etch out aluminum metal from extrusion dyes, has been used effectively as a coagulation aid agent. This provides a commercial benefit to aluminum fabricators (who would now not have to bear the expense of (a) neutralizing the waste caustic, a common state law regulatory requirement, and (b) precipitating aluminum (via a filter press) and hauling it to a waste site.

In some cases, such as exemplified by FIG. 5, the process stream itself may contain flocculation aid chemicals. In other cases, the waste alkali solution may contain flocculation aid chemicals. In such cases, external dosing of coagulation aid chemicals may not be required or, at a minimum, could be minimized. An example of such a stream is a waste caustic stream, such as that referenced above, from an aluminum fabrication plant; often, such caustic streams contain a substantial level of aluminum. Coagulants are typically used at pH values below about 10.5.

With reference to FIG. 1A, chemical feed system CF-205 for adding polyelectrolyte, and with reference to the alternative embodiment of FIG. 2, polyelectrolyte addition at settling tank (clear well) T-205, and with reference to FIG. 5, step 512, a measured amount of polyelectrolyte is preferably added to aid the filtration and solids-settling process. Once again, a homogeneous solution is preferably created by adding mixing energy.

The term "polyelectrolyte" is a generic term known in the water treatment industry (analogous to the term "PVC" to the non-metallic fabricator). Polyelectrolyte chemicals are generally high-molecular-weight, long-chain organic chemicals with either positive or negative charge (the type being selected based on the nature of the electrical charge found on precipitate).

Sometimes, contrasting approaches are used with respect to the coagulation aid polymers and the polyelectrolyte chemicals in the water softening process. The coagulation aid and the polyelectrolyte may be added together or separately to a quantity of the process stream. For example, one might employ alum and a cationic polymer to make solids heavier and settle down. Then, one might end up with a small level of excess polymer that will tend to float away or bypass the system. However, by adding a polyelectrolyte of opposite charge, one can capture the small floating materials, still representing suspended solids, and make a secondary precipitation to achieve greater clarification. Polyelectrolyte's are typically used at pH values below about 10.5.

Figure 7:
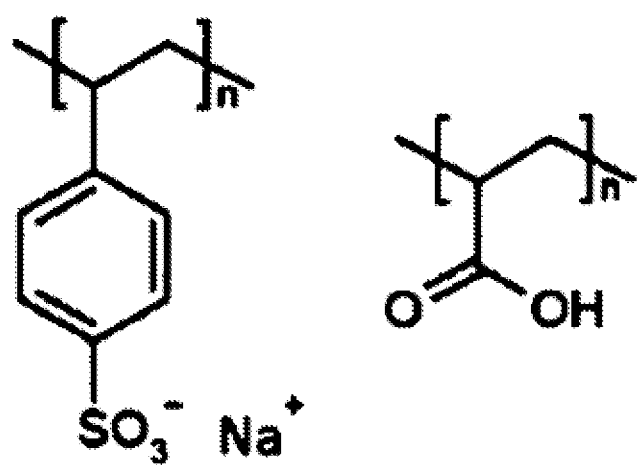
FIG. 7 exemplifies a polyelectrolyte chemical structure.

Publicly available resources describe the polyelectrolyte chemical structure exemplified in FIG. 7 as chemical structures of two synthetic polyelectrolytes. The left hand structure is poly(sodium styrene sulfonate) (PSS); the right hand structure is poly(acrylic acid) (PAA). Both are negatively charged polyelectrolytes when dissociated. PSS is a 'strong' polyelectrolyte (fully charged in solution), whereas PAA is 'weak' (partially charged).

Polyelectrolytes are polymers whose repeating units bear an electrolyte group. These groups will dissociate in aqueous solutions (water), making the polymers charged. Polyelectrolyte properties are thus similar to both electrolytes (salts) and polymers (high molecular weight compounds), and are sometimes called polysalts. Like salts, their solutions are electrically conductive. Like polymers, their solutions are often viscous. Many biological molecules are polyelectrolytes. For instance, polypeptides (thus all proteins) and DNA are polyelectrolytes. Both natural and synthetic polyelectrolytes are used in a variety of industries.

Figure 3:
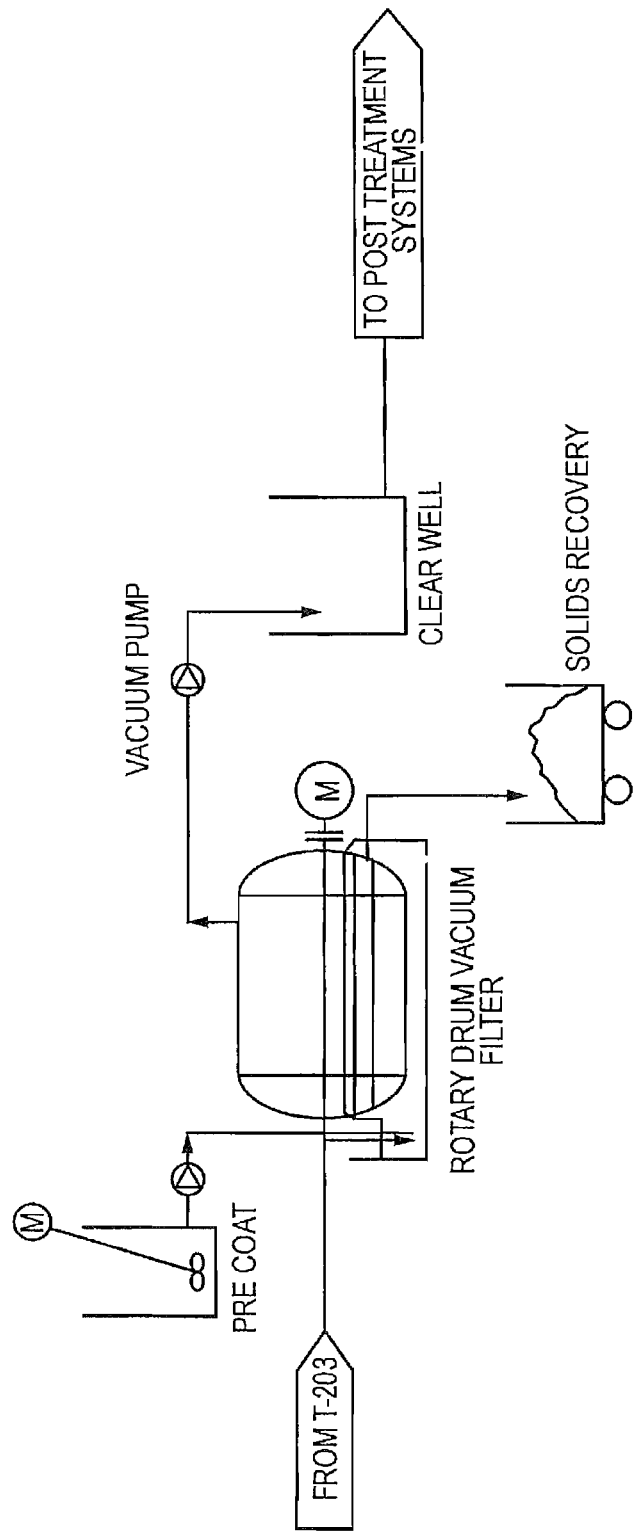
FIG. 3 exemplifies a piping/instrumentation drawing showing several aspects of a rotary drum vacuum filter of the novel water-softening process disclosed herein, the rotary drum vacuum filter being adaptable for replacing or supplementing the process T-204 of FIGS. 1A and 1B.
Figure 4:
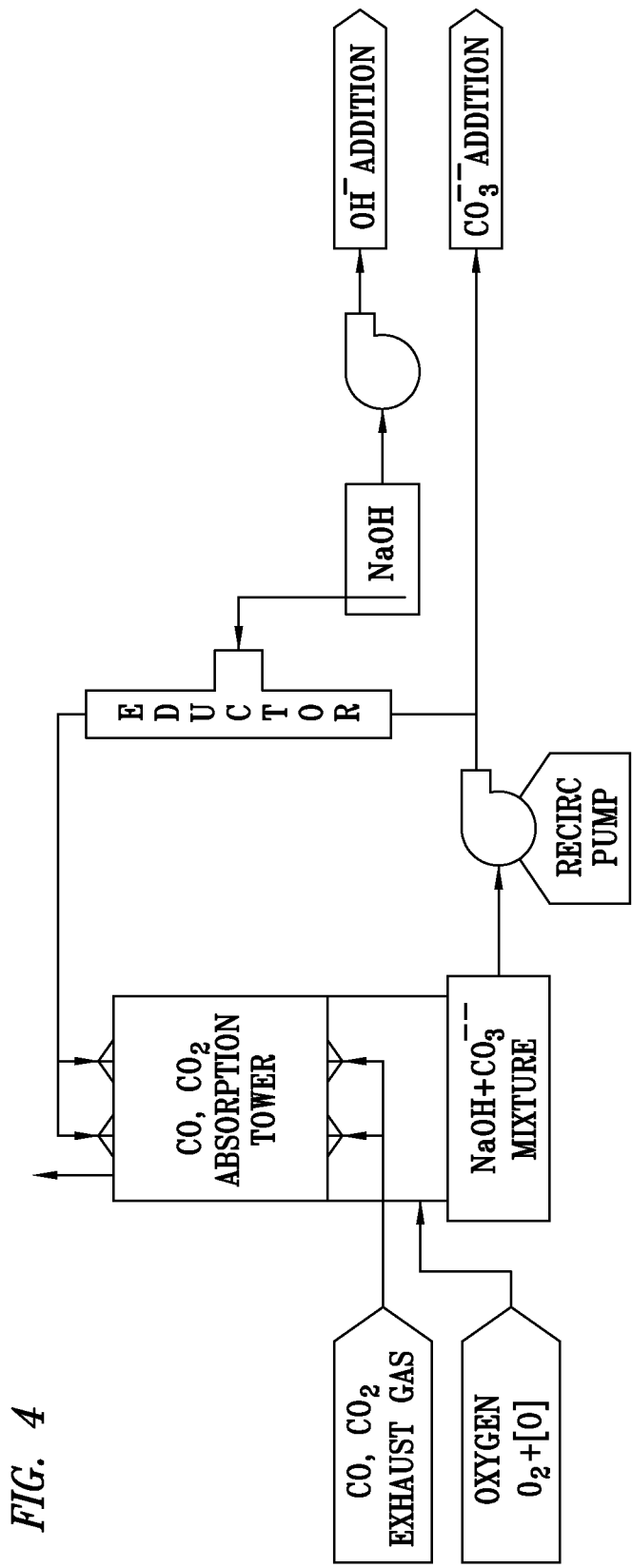
FIG. 4 exemplifies a piping/instrumentation drawing showing several aspects of a carbon dioxide unit embodying features of the novel water-softening process disclosed herein.

With reference to step 514 of FIG. 5, the settling of solids is exemplified by FIG. 1A, which depicts removal of most of settled solids, and in tank T-204 where sludge is removed, though some small level of lighter solids can escape, the treatment of which is discussed in further detail below. In the alternative embodiment of FIG. 2, settled solids are depicted going from tank T-201 to FP-301. Removal of suspended solids is exemplified by FIG. 1B, which depicts mechanical separation by media filter and cartridge filter. In an alternative embodiment, FIG. 2 depicts the removal of settled solids by filter press and, in FIG. 3, the removal of suspended solids by rotary drum vacuum filter. FIG. 1A, T-103, exemplifies removal of oil and lighter floc.

The solids are allowed to settle in a process that is commonly known as settling or clarification. Heavier solids, mostly carbonate or bicarbonate precipitates and metal hydroxide precipitates settle and some of the lighter suspended solids, such as oil and grease, light organic matter, silica and colloidal material, get adsorbed onto the carbonate and hydroxide precipitates, and settle with other solids.

In some processes, a lighter floc is created which will tend to rise above the process solution. In those cases, solids can be removed from the top by using equipment such as oil skimmers or dissolved air flotation.

Reaction time for completing the various process steps may vary depending on the nature of water stream. In most cases, utilizing typical commercial mechanisms, a thirty-minute reaction time is sufficient although, in select applications, the reaction may continue for several hours or days.

The alkalinity, pH adjustors, the coagulant and electrolytes (reagent), may be added together or at the same time or over very short periods as well as separately at time periods selected based upon properties of the specific contaminants in the treated stream or batch of contaminated water. In either event, the treatment with each reagent is carried out at a pH from 10.5 to 14.

The contaminated water stream may be treated in selected quantities in a batch process or with the same or similar reagents in an in-line process wherein the reagents are added separately or together into a flowing stream of the contaminated stream. In either case the treatment with all of the reagents either together or separately is at 10.5 to 14.

For example, in a wastewater that contained 10,500 ppm calcium and magnesium hardness, very high efficiency softening, at or about the 99.99% level, has been observed with less than 0.1 ppm hardness levels by using longer contact times; nearly 99% level softening, with less than 100 ppm hardness level, has been observed by using 30 minute contact times. Test results are shown in Table 1 below.

TABLE 1

| Contaminant Parameter (Mg/L) | Contaminated Water Inlet (Mg/L) | HESP Outlet (Mg/L) | % Reduction |
|---|---|---|---|
| Calcium + Magnesium | 10,500 | <1.0 | 99.99 |
| Barium | 12 | 0.4 | 96.7 |
| Strontium | 382 | 16.9 | 95.6 |
| Silica | 61 | 8.6 | 85.9 |
| Total Organic Carbon | 30 | 4.7 | 84.3 |
| Oil and Grease | 21 | <1.0 | 95.2 |
| Iron | 4.9 | 0.01 | 99.8 |
| Copper | 4.9 | 0.01 | 99.8 |
| Zinc | 2.76 | 1.14 | 99.6 |

The process of the present invention is effective to remove contaminants from highly contaminated water streams. The reduction of most of the contaminants is greater than ninety percent as shown in Table 1. While the contaminants have been greatly reduced, the treated water is generally not suitable as potable water, but could be an acceptable stream for disposal or recycle without further treatment or as a feed stream which could be further purified for disposal to the environment. The removal of a high level of contaminants as achieved by the present process is highly desirable for treating many industrial processes which produce highly contaminated by-product streams.

With reference to FIG. 1A, Tank T-204, and with reference to the alternative embodiment of FIG. 2, reactor clarifier T-201, and with reference to FIG. 5, step 516, settled solids are preferably separated from the supernatant process solution. Solids can be removed from the bottom of a reactor vessel by means of a reaction clarifier or sludge thickener. In some cases, a scraper mechanism may be added to facilitate the removal of suspended solids. The clarified stream is collected in a storage vessel or other container for further processing.

As an option, a portion of the sludge can be re-circulated to further aid settling of the precipitated and suspended solids.

Figure 1B:
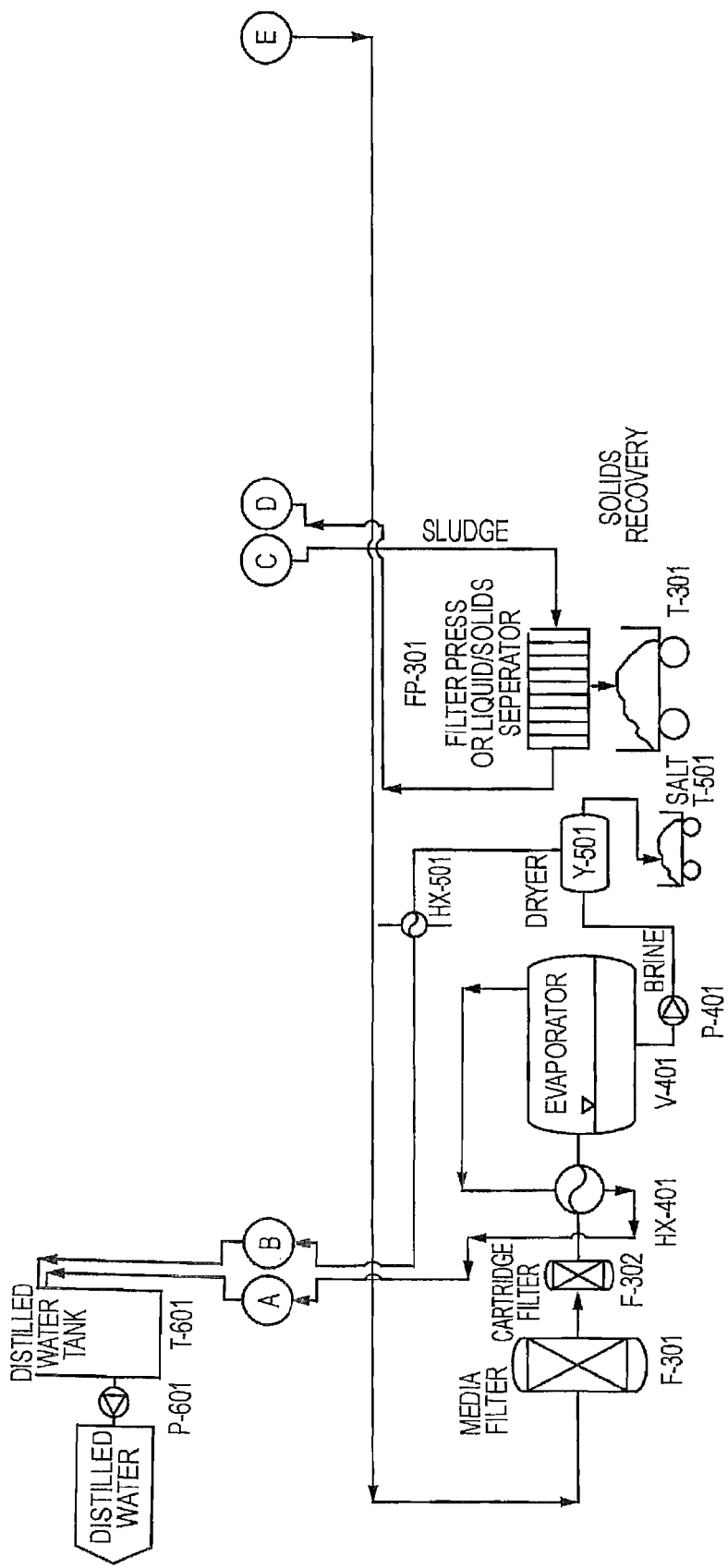

With reference to FIG. 1B, filter press FP 301, and with reference to the alternative embodiment of FIG. 2, filter press FP-301, and with reference to FIG. 5, step 518, solids may separate from a thickened sludge and may be recovered from the reactor vessel by using a mechanical device such as filter press, vacuum press, rotary drum vacuum filter, membrane filter, ultrafilter, or microfilter. Clear liquid is recovered and recycled for further use, and solids are preferably recovered as a filter cake. The filter cake can be dried to recover the precipitated solids. The solids can be recycled for further use.

Figure 6:
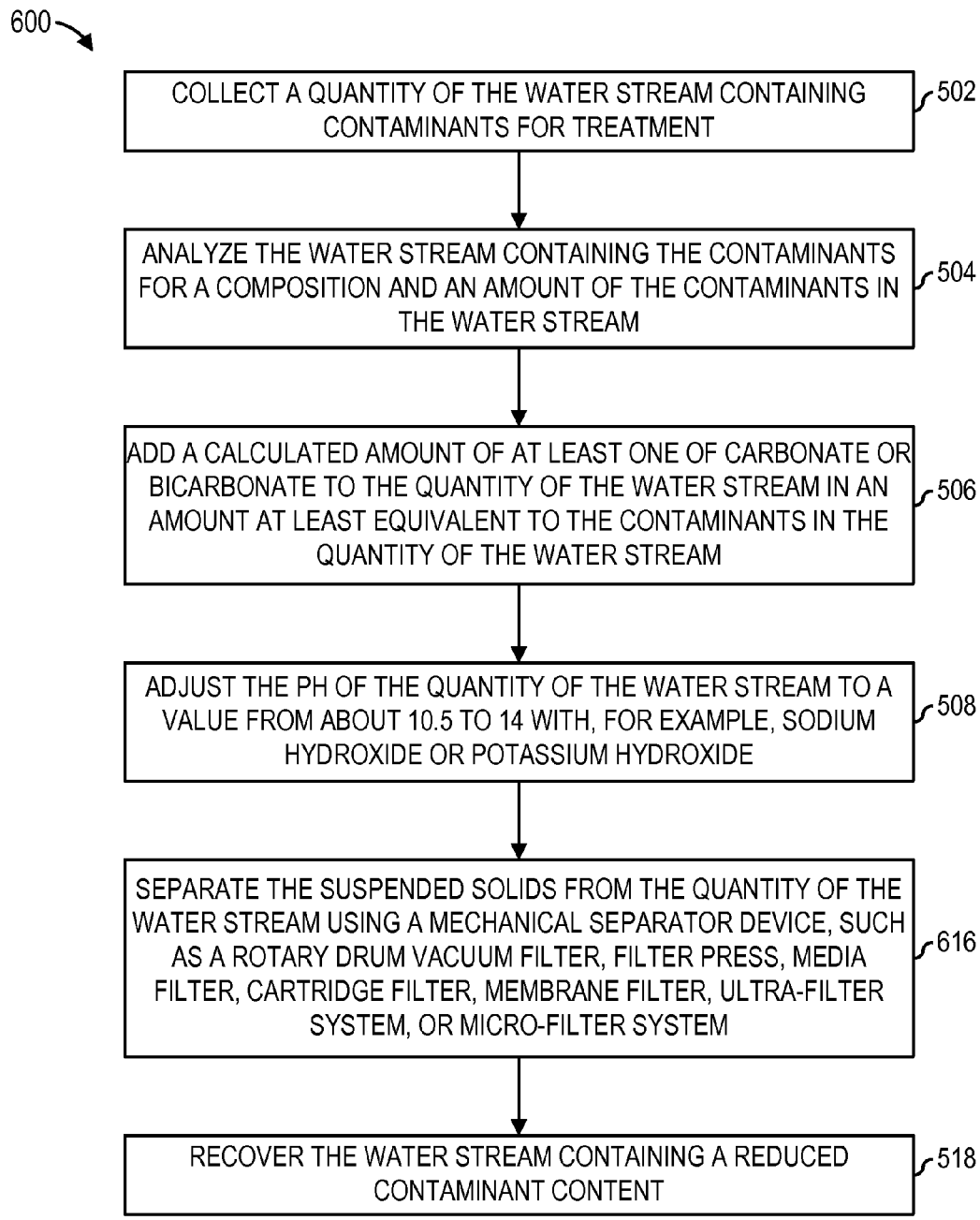
FIG. 6 exemplifies steps of a process utilizing a mechanical separator device in accordance with an alternate preferred embodiment of the present invention.

FIG. 6 exemplifies an alternative embodiment of the invention, similar to FIG. 5, but in which it may be preferable to not add the coagulation aid chemical of step 510, and keep the precipitated solids in suspension. In such a case, steps 510-516 of FIG. 5 are preferably replaced by a step 616, depicted in FIG. 6, wherein precipitated solids, along with other suspended solids and colloidal solids, are preferably removed from the bulk stream by using a mechanical, solid-liquid separator, such as an advanced filtration process, such as a rotary drum vacuum filter, filter press, media filter, membrane filter, ultra-filter system, micro-filter system, or the like.

A person of ordinary skill in the art to which this invention pertains will immediately recognize a number of alternative design components/variations which would be appropriate to utilize in the face of various process stream exigencies; some of these are described hereinbelow.

In some cases, the number of process/reaction steps, as described above, may be reduced by combining several steps.

In some cases, the desired chemical reaction associated with a particular step or steps will be sufficiently fast so that in-line addition of chemicals (rather than addition of chemicals directly to a reactor) is possible.

In some cases, the chemical reaction will be sufficiently fast, and reaction time sufficiently short, that minimizing the size of the reactor unit or adding the reagents to a flowing contaminated stream may be possible.

In some designs, it may be possible to eliminate mechanical mixers and still achieve satisfactory results.

In some designs, it may be advantageous to consider the use of skimmers to collect lighter particles, such as oil and grease.

In some designs, it may be advantageous to first remove lighter particles, such as oil and grease, via dissolved air flotation and/or particle settlers, and then follow this process stream pre-treatment with the novel softening process described herein.

In some designs, it may be advantageous to use enhanced particle settling devices such as inclined plate clarifiers or tube settlers. The effluent from these processes can be further treated by using mechanical filters such as sand filters, multi media filters, mixed-media filters, carbon filters, string-wound or blow-molded cartridge filters, or membrane filters such as ultra-filtration or micro-filtration. It should be noted here that, as exemplified by FIG. 6, some of the membrane systems that use Ultra-Filtration or Micro-Filtration membranes may not require addition of coagulation aid chemicals; accordingly, those systems may not require such chemical feed systems.

In some cases, the seeded slurry process can provide effective results. In this process, a known amount of salts (example: $CaSO_4$) are added to the reactor vessel to promote fast chemical reaction.

Inversely, the novel water-softening process disclosed herein can be usefully employed for the recovery of precious minerals such as calcium, magnesium, barium, strontium, iron, and manganese.

In some cases, waste chemicals such as waste alkali from industrial operations, demineralizer regeneration operations, waste alkali from aluminum or iron fabrication processes, waste potash (potassium carbonate), or waste potassium hydroxide could be used in place of pure chemicals. The use of these waste chemical streams presents a two-fold advantage to the commercial operator: first, one reduces the burden on the environment by not disposing of waste chemicals which would have to be neutralized prior to discharge in most countries; and, second, one can minimize the raw direct chemical costs for the process, since fresh, high-purity chemicals can be very expensive.

In some cases, as described hereinabove, waste gases such as carbon dioxide or carbon monoxide could be combined with an alkaline solution such as sodium hydroxide or potassium hydroxide to form bicarbonate or carbonate ions. These bicarbonate or carbonate ions can then react with the incoming Ca, Mg, Ba or Sr to form the precipitate.

In some cases, sulfate ions can be added to form a precipitate. Sulfate ions can be derived from the use of certain inorganic salts such as barium sulfate.

In some cases, crushed lime, hydrated lime, or pulverized soda ash can be considered.

One way to create a sodium carbonate or sodium bicarbonate or potassium carbonate or potassium bicarbonate solution is to react carbon dioxide with sodium hydroxide or potassium hydroxide in a reactor column. Specifically, a sodium hydroxide or potassium hydroxide solution is sprayed in an absorption column that comprises a reactor vessel, internal distributors, and a mass-transfer packing (structured packing or dumped packing)

Carbon dioxide ($CO_2$) and/or carbon monoxide (CO) gas is preferably introduced at the bottom of the reactor vessel in a counter-current manner. Excess air or ozone can be added to enhance reaction of carbon monoxide. After reaction, either the sodium carbonate or potassium carbonate solution is collected in the receiver vessel, ready for use. At a pH above 8.2, one expects to find mostly carbonate species. At a pH below 8.2, one expects to find an equilibrium of bicarbonate and carbon dioxide.

It is understood that the present invention may take many forms and embodiments. Accordingly, several variations may be made in the foregoing without departing from the spirit or the scope of the invention. For example, use of ozone or electrocoagulation process to enhance oxidation process.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A process for removing at least some contaminants selected from the group consisting of Ca, Mg, Ba, Sr, Cu, Zn, iron, Mn, A1, SiO2, TOC, oil, grease, and TDS and TSS from a contaminated water stream, the process comprising steps of:
    collecting a quantity of the water stream containing said contaminants for treatment;
    analyzing the composition of the quantity of the water stream containing said contaminants for an amount of said contaminants in the quantity of the water stream;
    adding at least one of carbonate or bicarbonate to the quantity of the water stream in an amount at least stoichiometrically equivalent to said contaminants in the quantity of the water stream;
    adjusting the pH of the quantity of the water stream to a value from about 10.5 to 14;
    separating the solids including said contaminants from the quantity of the water stream; and
    recovering water containing a reduced contaminant content, wherein the step of separating comprises:
    adding at least one of a coagulation or flocculation aid chemical to the quantity of the water stream, except where the water stream comprises an effective amount of aluminum material or caustic soda to effect flocculation or coagulation of solids of the contaminants of the water stream, and
    and allowing solids formed by the coagulation or flocculation, including said contaminants and carbonate or bicarbonate and hydroxide precipitates in the quantity of the water stream to settle or rise from the water in a settling tank.

2. The process of claim 1, wherein the step of adjusting the pH further comprises adjusting the pH of the quantity of the water stream to a value from about 10.5 to 14 with at least one of sodium hydroxide and potassium hydroxide.

3. The process of claim 1, wherein the step of adjusting the pH further comprises adjusting the pH of the quantity of the water stream to a value from about 10.5 to 14 with at least one of carbon dioxide and carbon monoxide.

4. The process of claim 1, wherein the step of adjusting the pH further comprises adjusting the pH of the quantity of the water stream to a value from about 10.5 to 14 with at least one of lime and soda ash.

5. The process of claim 1, wherein the step of separating further comprises:
adding at least one polyelectrolyte selected from the group consisting of positive and negative polyelectrolyte chemicals to the quantity of the water stream.

6. The process of claim 1, wherein the coagulation aid chemical is selected from the group consisting of ferric chloride, alum, ferric sulfate and a waste caustic soda from an alumina plant, and the step of separating further comprises:
adding at least one polyelectrolyte selected from the group consisting of positive and negative polyelectrolyte chemicals to the quantity of the water stream.

7. The process of claim 1 wherein the quantity of the water stream is collected in a storage tank containing a separation system for removing precipitated contaminants from the storage tank.

8. The process of claim 1 wherein the formed solids settle in the quantity of the water stream.

9. The process of claim 1 wherein the formed solids remain in suspension or float in the quantity of the water stream.

10. The process of claim 1 wherein at least a portion of the step of separating the solids from the quantity of the water stream is performed by mechanical separation equipment selected from the group consisting of at least one of a reaction clarifier and a sludge thickener.

11. The process of claim 1 wherein the step of separating the solids from the quantity of the water stream further comprises treatment in a mechanical solid/liquid separator.

12. The process of claim 1 wherein the step of separating the solids from the quantity of the water stream further comprises treatment in a mechanical solid/liquid separator selected from the group consisting of a rotary drum vacuum filter, a press filter, a media filter, a membrane filter, or an ultra-filter system or a micro-filter system.

13. The process of claim 1 wherein the calcium plus magnesium contaminants in the quantity of the water stream are removed to a level less than 100 parts per million.

14. The process of claim 1 wherein the calcium plus magnesium contaminants in the quantity of the water stream are reduced to less than 1 percent of the calcium plus magnesium initially present.

15. The process of claim 1 wherein steps of collecting, adding, and adjusting are carried out in a storage tank.

16. The process of claim 1 wherein the calcium plus magnesium content, stated as $CaCO_3$, of the water, is reduced to less than 100 ppm and the TOC content of the water is reduced.

17. A process for removing at least some contaminants selected from the group consisting of Ca, Mg, Ba, Sr, Cu, Zn, iron, Mn, A1, SiO2, TOC, oil, grease, and TDS and TSS from a contaminated water stream, the process comprising steps of:
analyzing the composition of the quantity of the water stream containing said contaminants for an amount of said contaminants in the quantity of the water stream;
adding at least one of carbonate or bicarbonate to the quantity of the water stream in an amount at least stoichiometrically equivalent to said contaminants in the quantity of the water stream;
adjusting the pH of the quantity of the water stream to a value from about 10.5 to 14;
separating the solids including said contaminants from the quantity of the water stream; and
recovering water containing a reduced contaminant content, wherein the step of separating comprises:
adding at least one of a coagulation or flocculation aid chemical to the quantity of the water stream, except where the water stream comprises an effective amount of aluminum material or caustic soda to effect flocculation or coagulation of solids of the contaminants of the water stream, and
and allowing solids formed by the coagulation or flocculation, including said contaminants and carbonate or bicarbonate and hydroxide precipitates in the quantity of the water stream to settle or rise from the water in a settling tank.

18. The process of claim 17, wherein the step of adjusting the pH further comprises adjusting the pH of the water stream to a value from about 10.5 to 14 with at least one of sodium hydroxide and potassium hydroxide.

19. The process of claim 17, wherein the step of adjusting the pH further comprises adjusting the pH of the water stream to a value from about 10.5 to 14 with at least one of carbon dioxide and carbon monoxide.

20. The process of claim 17, wherein the step of adjusting the pH further comprises adjusting the pH of the water stream to a value from about 10.5 to 14 with at least one of lime and soda ash.

21. The process of claim 17, wherein the step of separating further comprises:
adding at least one polyelectrolyte selected from the group consisting of positive and negative polyelectrolyte chemicals to the water stream.

22. The process of claim 17, wherein the coagulation aid chemical is selected from the group consisting of ferric chloride, alum, ferric sulfate and a waste caustic soda from an alumina plant, and the step of separating further comprises:
adding at least one polyelectrolyte selected from the group consisting of positive and negative polyelectrolyte chemicals to the water stream.

23. The process of claim 17 wherein the quantity of the water stream is collected in a storage tank containing a separation system for removing precipitated contaminants from the storage tank.

24. The process of claim 17 wherein at least a portion of the step of separating the solids from the quantity of the water stream is performed by mechanical separation equipment selected from the group consisting of at least one of a reaction clarifier and a sludge thickener.

25. The process of claim 1 wherein the step of separating the solids from the quantity of the water stream further comprises treatment in a mechanical solid/liquid separator.

26. The process of claim 1 wherein the step of separating the solids from the quantity of the water stream further comprises treatment in a mechanical solid/liquid separator selected from the group consisting of a rotary drum vacuum filter, a press filter, a media filter, a membrane filter, or an ultra-filter system or a micro-filter system.

27. The process of claim 17 wherein the calcium plus magnesium contaminants in the quantity of the water stream are removed to a level less than 100 parts per million.

28. The process of claim 17 wherein the calcium plus magnesium contaminants in the quantity of the water stream are reduced to less than 1 percent of the calcium plus magnesium initially present.

29. The process of claim 17 wherein the calcium plus magnesium contents, stated as $CaCO_3$, of the water, is reduced to less than 100 ppm and the TOC content of the water is reduced.

30. A process for removing one or more contaminants from a contaminated water stream, at least one of which one or more contaminants is selected from the group consisting of Ca, Mg, Ba, Sr, Cu, Zn, iron, Mn, Al, SiO2, TOC, oil, grease, and TDS and TSS, the process comprising steps of:

analyzing the composition of the quantity of the water stream containing said contaminants for an amount of said contaminants in the quantity of the water stream;

adding at least one of carbonate or bicarbonate to the quantity of the water stream in an amount at least stoichiometrically equivalent to said contaminants in the quantity of the water stream;

adjusting the pH of the quantity of the water stream to a value from about 10.5 to 14;

separating the solids including said contaminants from the quantity of the water stream; and recovering water containing a reduced contaminant content, wherein the step of separating comprises:

adding at least one of a coagulation or flocculation aid chemical to the quantity of the water stream, except where the water stream comprises an effective amount of aluminum material or caustic soda to effect flocculation or coagulation of solids of the contaminants of the water stream, and and allowing solids formed by the coagulation or flocculation, including said contaminants and carbonate or bicarbonate and hydroxide precipitates in the quantity of the water stream to settle or rise from the water in a settling tank.

* * * * *